Patented Feb. 23, 1932

1,846,185

UNITED STATES PATENT OFFICE

MAX CLINE, OF GLENS FALLS, AND RALPH A. MASTEN, OF SOUTH GLENS FALLS, NEW YORK, ASSIGNORS TO INTERNATIONAL PAPER COMPANY, OF NEW YORK, N. Y., A CORPORATION OF NEW YORK

MULCH PAPER AND PROCESS OF MAKING SAME

No Drawing.    Application filed January 14, 1930. Serial No. 420,812.

The present invention relates to improvements in mulch papers. In general, it is the object of my invention to provide such a paper which will not only have the usual properties of accelerating seed germination, of intensifying the growth of the produced seedlings, of suppressing weeds and of eliminating cultivation but which will have improved fungi and insect resisting qualities. As at present constituted, many mulch papers now in use are subject to the action of mold and other fungi and insects, as a result of which they disintegrate before germination has proceeded to the requisite degree.

In carrying out our invention, we prefer to employ copper sulphate as a fungicidal agent. While this property of copper sulphate has heretofore been recognized, the difficulty has been that in many instances this substance has been leached out of the paper by the action of the rain and ground moisture and the paper thus left in a state in which it was prey to attack from fungi and insects. Accordingly, our invention is concerned in preventing this loss of the copper sulphate and preferably, and in accordance therewith, we not only fix the copper radical but also the sulphate radical whereby both are rendered effective as fungicides. Accordingly, by using the proper precipitant for the sulphate radical, the resulting toxicity of the compound may be greatly increased. Thus, by using a barium salt, for example, as the precipitant the barium sulphate formed aids greatly to the effectiveness of the copper compounds. The copper may be precipitated in one of a number of ways but preferably as cupric hydroxide or carbonate.

Our invention will be fully understood by reference to the following specific example of the process best known to us:

For the treatment of 100 lbs. of paper, we may use 2 lbs. of copper sulphate dissolved in a suitable quantity of water and applied preferably to the partially or completely dried paper on the paper making machine, by passing it through a trough containing the solution. The impregnated paper is then passed through a bath containing the copper precipitant, e. g. a suitable quantity of caustic soda, or of sodium carbonate, whereby the copper is precipitated on the paper fibers in an insoluble form either as the hydroxide $Cu(OH)_2$ or as the carbonate $CuCO_3$ depending whether the caustic soda or sodium carbonate is used. The paper is now preferably fed directly into a bath containing barium chloride which causes the sulphate radical to precipitate on the fibers as barium sulphate. The paper is now dried and has applied thereto, as by coating and/or impregnation, asphalt, bitumen or tar as desired, as is well known in the art of making paper mulches.

If desired, the sulphate precipitation may be omitted and the bituminous coating applied after the copper precipitation with, however, a corresponding loss of efficiency. In this case metal salts other than the sulphate may be used, as, for example, cuprous chloride. Further, in lieu of barium as the precipitant, we may use calcium in the form of calcium chloride although the barium salt is preferred because of its greater toxicity per se. In lieu of proceeding as above, the finished paper after having left the paper making machine may be treated with the chemicals in the manner given above.

It will be obvious that the amount of the chemicals used will be determined substantially in accordance with the amount of copper sulphate started with and that this may be varied considerably depending upon the degree of fungicidal action required. Further, it will be evident that the invention is also applicable to metal salts other than copper sulphate, as, for example, copper acetate and zinc sulphate. Also, changes may be made in the process as given, as for example, the order of precipitation may be varied if desired.

In the claims, the word "coating" in the expression "and coating the thus impregnated paper with a bituminous substance" is used both in the sense of impregnation and coating.

We claim:

1. In the process of making a paper mulch, the steps which consist in first impregnating the paper with a water soluble salt having fungicidal properties, then precipitating the metal radical of the salt upon the fibers of the paper, then precipitating the acid radical of the salt upon said fibers, and coating the thus impregnated paper with a bituminous substance.

2. In the process of making a paper mulch, the steps which consist in impregnating the paper with copper sulphate, then precipitating the copper radical upon the fibers of the paper and then the sulphate radical upon said fibers and coating the thus impregnated paper with a bituminous substance.

3. In the process of making a paper mulch, the steps which consist in impregnating the paper with copper sulphate, then precipitating the copper radical upon the fibers of the paper and then the sulphate radical upon said fibers as barium sulphate and coating the thus impregnated paper with a bituminous substance.

4. In the process of making a paper mulch, the steps which consist in impregnating the paper with copper sulphate, then precipitating the copper radical upon the fibers of the paper as cupric hydroxide and then the sulphate radical upon said fibers and coating the thus impregnated paper with a bituminous substance.

5. In the process of making a paper mulch, the steps which consist in impregnating the paper with copper sulphate, then precipitating the copper radical upon the fibers of the paper as cupric carbonate and then the sulphate radical upon said fibers and coating the thus impregnated paper with a bituminous substance.

6. A mulch comprising paper containing a fungicidal compound of a metal precipitated upon the fibers of the paper and a coating of a bituminous compound thereover.

7. A mulch comprising paper containing a copper compound precipitated thereon and a coating of a bituminous compound thereover.

8. In the process of making a paper mulch, the steps which consist in first impregnating the paper with a water soluble salt having fungicidal properties, then precipitating the metal radical of the salt upon the fibers of the paper, then precipitating the acid radical of the salt upon said fibers, drying the paper thus impregnated and coating the dried paper with a bituminous substance.

In testimony whereof we have affixed our signatures to this specification.

MAX CLINE.
RALPH A. MASTEN.